United States Patent [19]

Gortan

[11] Patent Number: 4,480,816

[45] Date of Patent: Nov. 6, 1984

[54] APPARATUS FOR CLAMPING AND/OR LONGITUDINALLY MOVING AN ELONGATE TRACTION MEANS

[75] Inventor: Guido Gortan, Itzig, Luxembourg

[73] Assignee: Secalt, S.A., Dumoulin, Luxembourg

[21] Appl. No.: 376,936

[22] Filed: May 10, 1982

[30] Foreign Application Priority Data

May 13, 1981 [EP] European Pat. Off. ........ 81103685.4

[51] Int. Cl.³ .......................... B66D 1/00; B66F 1/02
[52] U.S. Cl. .................................. 254/264; 254/254; 254/384
[58] Field of Search .............. 254/245, 246, 251, 253, 254/254, 259, 264, 384; 182/5, 136; 24/134 N, 115 L, 132 WL, 134 R, 134 KB; 74/162, 160, 156

[56] References Cited

U.S. PATENT DOCUMENTS

| | | | |
|---|---|---|---|
| 1,114,832 | 10/1914 | Whitney | 182/136 |
| 1,143,713 | 6/1915 | Kirstin . | |
| 1,202,279 | 10/1916 | Frost . | |
| 1,231,014 | 6/1917 | Goodwill . | |
| 1,920,686 | 8/1933 | Faure | 254/264 |
| 2,184,379 | 12/1939 | Burner . | |
| 3,222,742 | 12/1965 | Persiaux | 254/264 X |
| 3,995,830 | 12/1976 | Desplats . | |
| 4,032,110 | 6/1977 | Rinio | 254/384 |

FOREIGN PATENT DOCUMENTS

| | | |
|---|---|---|
| 840586 | 6/1952 | Fed. Rep. of Germany . |
| 2045501 | 4/1971 | Fed. Rep. of Germany . |
| 2260623 | 6/1973 | Fed. Rep. of Germany . |
| 2533469 | 10/1976 | Fed. Rep. of Germany . |
| 1489029 | 7/1967 | France . |
| 2097028 | 3/1972 | France . |
| 2243141 | 4/1975 | France . |

*Primary Examiner*—Stuart S. Levy
*Assistant Examiner*—Katherine Jaekel
*Attorney, Agent, or Firm*—Body, Vickers & Daniels

[57] ABSTRACT

An apparatus for clamping and longitudinally moving an elongate tension or traction means such as a wire rope relative to a casing of a lifting apparatus is provided with two pairs clamping jaws operated by clamping levers. Pairs of clamping jaws are alternately closed against the rope to move the rope in the direction of traction. In order to avoid subjecting the rope to compressive loads in the longitudinal direction during clamping, the clamping jaws are interconnected so that they are immovable in relation to one another in the longitudinal direction of the wire rope. Clamping keys for generating the clamping pressure are irrotationally connected to the clamping levers and pivotally mounted in circular apertures of one of the clamping jaws. These clamping keys slidably press onto the other clamping jaw directly or indirectly such that they cannot apply a compressive force in the longitudinal direction of the wire rope to the clamping jaw.

16 Claims, 10 Drawing Figures

APPARATUS FOR CLAMPING AND/OR LONGITUDINALLY MOVING AN ELONGATE TRACTION MEANS

BACKGROUND OF THE INVENTION

The invention relates to an apparatus for clamping and/or longitudinally moving an elongate traction means, such as a wire rope or rod or other tension bearing linear body relative to a casing or frame of a lifting apparatus or the like. The apparatus comprises at least one first clamping jaw and at least one second clamping jaw provided on mutually opposite sides of a linear body and adapted to be moved in relation to one another transversely to the longitudinal direction of the linear body with the aid of at least one clamping lever. The clamping lever acts on a clamping key mechanism finding support against both clamping jaws and being rotatable in at least one clamping jaw.

DISCUSSION OF THE PRIOR ART

Clamping apparatus is used in manually operated lifting apparatus by means of which a wire rope passing therethrough and fixed to a load can be pulled, released or held immovably. A clamping device for such traction or lifting apparatus is described in French patent specification No. 1,489,029 in which the clamping keys are shaped members having semicircular cross sections laterally displaced in relation to one another along a diametrical plane and integrally interconnected along part of said diametrical plane. Each of the half-cylinders members projects beyond the cylinder periphery of the adjoining hemicylinder. Each pair of clamping jaws is associated with two clamping keys, the ends of which are fitted into correspondingly shaped recesses in clamping levers provided on both sides of the clamping jaws. When the clamping levers are swung in the traction direction the clamping keys press by means of one half-cylinder into a partly cylindrical recess in the first clamping jaw and with the other half-cylinder into a partly cylindrical recess of the second clamping jaw, causing the clamping jaws to be pressed together gripping a rope or the like therebetween. The clamping keys revolve about a central axis positioned between the longitudinal axes of the half-cylinders. The half-cylinders, therefore, revolve eccentrically and perform a swinging movement in addition to a rotary movement. This moves the two clamping jaws in the longitudinal direction of the wire rope in opposition to one another. The wire rope is thereby subjected to a high clamping pressure acting in the transverse direction and simultaneously to a high compressive force acting in the longitudinal direction of the rope. This unnecessary longitudinal force subjects the wire rope or other linear body to substantial wear and opens the spaces between the rope strands allowing the entry of foreign matter and distorting strand elements. Moreover, part of the lever force is converted by the eccentric combined rotary and swinging movement into a longitudinal force opposed to the direction of the traction which tends to disengage that clamping jaw moving against the tension direction on the rope and to turn back the clamping keys into a position in which the clamping jaws may move apart. Accordingly, the clamping keys, when pulling a tensioned rope, do not act in a self-locking manner and waste a portion of the force applied for pulling the rope in useless opposed displacement of the clamping jaws on the rope in a manner causing damage to the rope or other linear body.

In addition, the cylindrical surfaces of the clamping keys and recesses in which they are disposed rub against one another under high mutual surface pressure while not only performing a pure rotary movement, but also a mutual translatory movement. This causes substantial wear. In addition, the manufacture of the clamping members and of the recesses adapted thereto in the clamping jaws is difficult and expensive.

A second clamping apparatus for traction and lifting apparatus is described in German laid-open specification No. 20 45 501, in which the clamping jaws are bolted together in pairs on mutually opposite sides of a traction means such as a wire rope or other linear body. At least two clamping levers form a linkage parallelogram. The two clamping levers are mutually movable transversely to the longitudinal direction of the traction means. In this case as well, the two clamping jaws perform a relative longitudinal movement in relation to one another, thus applying harmful longitudinal compressive stresses to the rope when tightening in the clamping action, whereby the rope is badly abused, resulting in its early wear.

The present invention avoids these disadvantages and provides a clamping apparatus for the clamping, pulling or releasing of a rope or other linear body passing therethrough composed of simple components which can be manufactured easily at low cost; which do not subject the rope to be clamped to compressive stresses in the longitudinal direction; and, with which the full clamping force can act on the rope transversely to the longitudinal direction of the traction means.

SUMMARY OF THE INVENTION

In accordance with the invention there are provided two co-acting clamping jaws which are held immovably in the longitudinal direction of the rope or other linear body being clamped.

Further in accordance with the invention, clamping keys are provided so adapted that they can only apply a force to the clamping jaws which is directed transversely to the longitudinal direction of the rope or other linear body when pivoted by the clamping levers or swung against the clamping jaws. This results in force being applied symmetrically onto two opposite sides of the rope or other linear body without causing compressive forces in the longitudinal direction of the rope. The rope or rod are thus subjected to less wear and tear and attain a longer life expectancy, as do the clamping jaws.

Further in accordance with the invention, clamping keys are provided slidable on one of the clamping jaws in the longitudinal direction of the traction means such that they can only transmit normal forces to the clamping jaw and carry out a pure rotary movement in their bearings in a clamping jaw. For a given pivoting angle, a clamping jaw stroke can be attained which is twice as large as that of known clamping apparatus having eccentrically designed clamping keys.

This clamping key arrangement also results in a closing mechanism which will bring clamping jaws together parallel to one another such that the clamping pressure is distributed uniformly over the entire length of the clamping jaws, thus avoiding the generation of stress peaks.

Further in accordance with the invention, clamping jaws are connected such that they move towards one another to clamp the rope between their mutually opposed clamping areas without being able to move relative to one another in the longitudinal direction.

Yet further in accordance with the invention, clamping jaws are interconnected by at least one strap having an elongate hole extending transversely to the longitudinal direction of the traction means, such elongate hole being engaged by a coupling pin provided on at least one clamping jaw.

In accordance with another aspect of the invention, clamping jaws are so designed that the first clamping jaw is fitted between two lateral flanges of the second clamping jaw and the clamping jaws are interconnected by at least one coupling member fixed in the one clamping jaw and slidable in a recess of the other clamping jaw transverse to the longitudinal direction of the traction means.

Further in accordance with the invention, the coupling member may take the form of a coupling bolt, both ends of which are fitted into apertures of the one clamping jaw and inserted into an elongate hole of the other clamping jaw extending transversely to the longitudinal direction of the traction means. It is particularly advantageous if in the lateral areas of the first clamping jaw grooves are provided transversely to the longitudinal direction of the traction means, engaged by coupling pins fixed in the side flanges of the second clamping jaw. These coupling pins, when assembling the clamping jaws are locked in place by clamping levers disposed outwardly of the clamping jaws such that the coupling pins cannot fall out.

Still further in accordance with the invention a clamping bolt shaped as a section of a cylinder which has a flat region along a part of its length is rotatably mounted in one of the clamping jaws and slidably supported on a supporting area of the other clamping jaw approximately parallel to the clamping surface. Two such clamping bolts can be arranged in a pair connected to the two clamping jaws and two clamping levers to form a linkage parallelogram.

In accordance with another aspect of the invention the clamping key finds support on the one clamping jaw by way of a pressure member comprising a cylindrical surface and a plane surface extending in the direction of the cylindrical axis. The pressure member is rotatably mounted in a partly cylindrical recess of the clamping key and slidably supported on its plane surface on a supporting surface on one clamping jaw extending approximately parallel to the clamping surfaces.

In accordance with a variant of this aspect, the pressure member is rotatably mounted having its cylindrical surface in a chord truncated cylindrical recess of the one clamping jaw and slidably in contact with a plane surface on the clamping key by means of its plane region. In both variants, the sliding movement in the longitudinal direction does not take place on the traction means or rope surface, but either between the pressure member and a plane supporting area provided on one of the clamping jaws or between the flat area on the clamping key and the plane surface of the pressure member such that normal forces only are transmitted onto the clamping jaws. In either of these variants, circular apertures are provided in the side flanges of the second clamping jaw in which the clamping key is held rotatably. These circular apertures can be manufactured easily and with great precision so that the clamping keys occupy an accurately defined position in relation to the clamping jaws.

Further in accordance with the invention the clamping keys have, for at least parts of their length, a semicircular cross-section having a radius corresponding to the radius of the circular apertures in the second clamping jaw. The clamping key may therefore consist quite simply of a section of a half-round rod or a round rod having a flattened side, drawn or turned out of steel.

Further in accordance with the invention, the pressure members in the first clamping jaw are offset from the center of the circular apertures of the second clamping jaws so as to occupy a position partly outside the circular apertures of the side flanges of the second clamping jaw and thus are held between the side flanges of the second clamping jaw against laterally shift under the pressure of the clamping key.

Yet further in accordance with this aspect of the invention, the clamping lever is irrotationally connected to the end of the clamping key and provided with a guide stud on its inside engaging into a circular aperture of the side flange of the second clamping jaw and sliding along the outside periphery of the aperture when the clamping lever is swung. This offers the advantage that the clamping keys may have chord truncated circular cross sections along their entire length without becoming displaced in the radial direction in the circular apertures of the second clamping jaw. The clamping keys will be held in position against the circular outer margins of the aperture by the guide studs provided on the clamping levers diametrically opposed to the clamping keys on the periphery of the apertures.

Yet further according to the invention, the two clamping jaws are connected jointly with the clamping levers to form a linkage parallelogram and the two clamping jaws are also interconnected by a centrally arranged strap or two straps on either side of the clamping apparatus, the straps being fitted onto two bolts which connect a clamping jaw to the clamping levers and having elongate holes engaging a coupling stud provided on either or both clamping jaws. The hinge point for a reverse lever or a lever for opening the clamping apparatus may also be provided on this strap.

Further in accordance with the invention, the two clamping jaws are connected jointly with the clamping levers to form a linkage parallelogram and the two clamping jaws are also interconnected by a centrally arranged strap or two straps on either side of the clamping apparatus, the straps being fitted onto two bolts which connect a clamping jaw to the clamping levers and having elongated holes engaging a coupling stud provided on either or both clamping jaws. The hinge point for a reverse lever or a lever for opening the clamping apparatus may also be provided on this strap.

Further in accordance with the invention, one clamping jaw carries a spring against which the other clamping jaw is supported directly or indirectly. If the second clamping jaw has a U-shaped cross section, the first clamping jaw is accommodated between the side flanges of the U-shaped clamping jaw and is suspended by the spring which longitudinally passes thereover from a spacer member interconnecting the two side flanges of the U-shaped second clamping jaw.

The invention may take physical form in certain parts and arrangements of parts, a preferred embodiment of which will be described in detail in this specification and illustrated in the accompanying drawings which form a part hereof and wherein.

DESCRIPTION OF THE PREFERRED EMBODIMENTS

Figure 1:
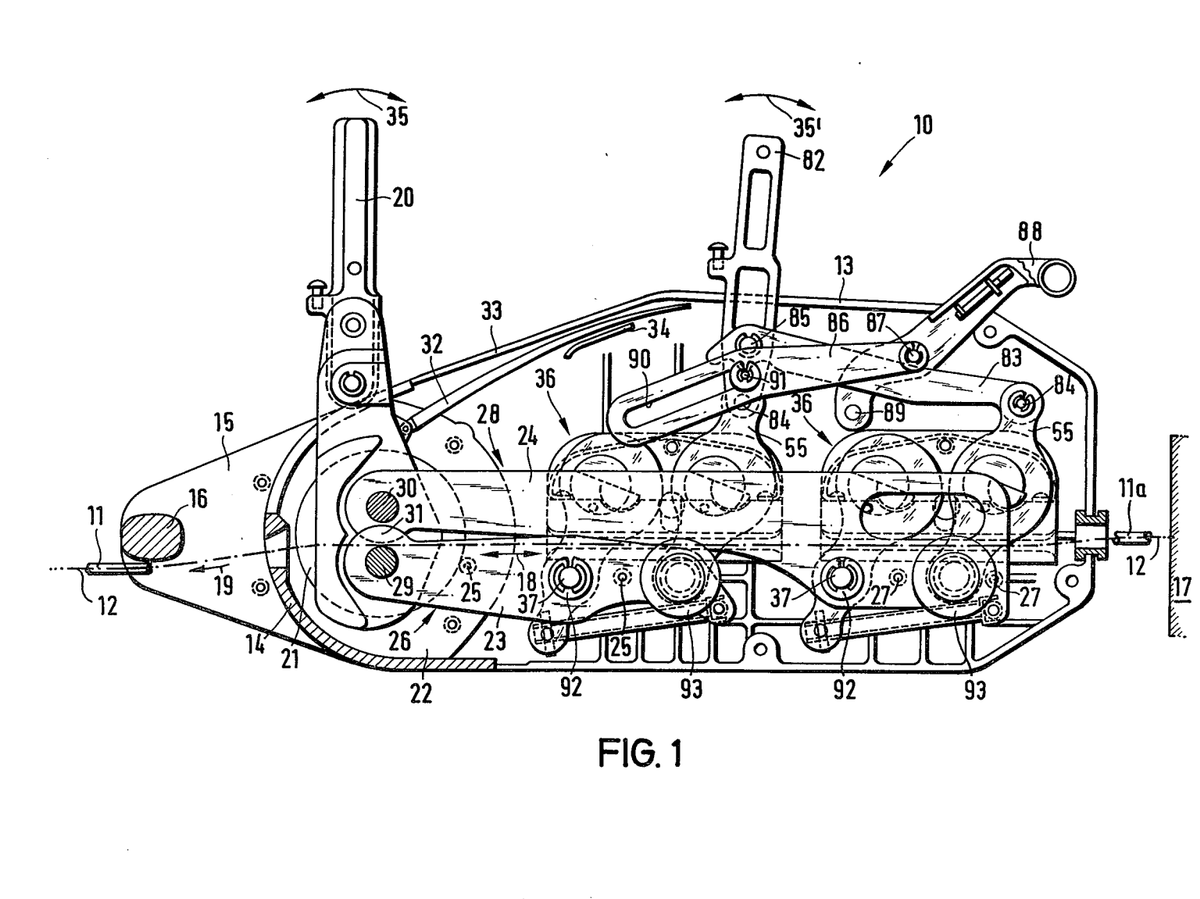
FIG. 1 is a longitudinal section of a manual lifting apparatus for pulling, clamping and releasing a traction rope passing therethrough including clamping means according to the invention in the clamping position.

Referring now to the drawings wherein the showings are for the purposes of illustrating the preferred embodiment of the invention only and not for the purpose of limiting same; a manual lifting apparatus 10 is shown for pulling clamping and releasing a traction means such as wire rope or rod 11 passing therethrough. Wire rope 11 has been omitted in most portions of the drawings and is merely indicated by its longitudinal axis 12. The manual lifting apparatus 10 comprises an elongate flat casing 13 of essentially rectangular cross section. The left hand end 14 has an extension 15 including an eye 16 or the like for attaching the manual lifting apparatus 10 to a fixed point. In FIG. 1, at the right hand end 11a of the traction means of wire rope 11 a load 17 is attached, being indicated only diagrammatically. The traction means or wire rope 11 is to move the load 17 in the longitudinal direction 18 of the wire rope 11 toward the left, the rope 11 being drawn through the manual lifting apparatus 10 in the direction of the arrow 19.

At the left hand end 14 of the casing 13 a crank shaft bearing block 22 is provided in which a crank shaft 21 is rotatably mounted having an advance lever 20 fixed thereto. Two pairs of push, pull or push and traction rods 23 and 24 are shown. The lower pair of rods 23 are connected by rivets 25 to form a lower closing off assembly 26. The upper pair of rods 24 are combined by rivets 27 to form an upper closing off assembly 28. Both pairs of rods are linked eccentrically to the crank shaft 21. In FIG. 1 only the near side push and traction rods of pairs 23 and 24 are visible, whereas these near side rods have been omitted in FIGS. 2, 6 and 9. The near side and far side rods of each pair are identical.

The push and traction rods 23 and 24 are linked by way of crank shaft studs 29 and 30 to the crank shaft and are positioned equidistantly on opposite sides of the center 31 of the crank shaft 21. The crank shaft 21 is mounted rotatably by way of ball bearings (not illustrated) in the crank shaft block 22. A rubber strap 32 is positioned above the push and traction rods 24 fixed to the crank shaft 21 which covers a slot 33 in the casing 13 and which slides back and forth between the upper edge of the latter and a guide baffle 34 in the longitudinal direction of the casing as the advance lever 20 is swung back and forth in the direction of the arrow 35.

Two clamping devices 36 are provided which are constructed according to the invention. The left hand clamping device is connected to the push and pull rods 23 of the lower closing off assembly 26 by which it is moved, while the right hand clamping device is connected to the push and pull rods 24 of the upper closing off assembly 28 by which it is moved. The clamping devices 36 slide to and fro on the traction means 11 which is guided within them. One clamping device 36 clamps the traction means 11 and pulls it in the direction of the arrow 19 through the apparatus while the other clamping device slides on the rope 11 in the opposition to the direction of the arrow 19, in the opened position. When the direction of travel 35 of the advance lever 20 is reversed the other clamping device closes on the rope applying traction in the direction of the arrow 19 and the previously active clamping device 36 is opened to slide along the rope 11 against its direction of traction 19 in the longitudinal direction 18.

The clamping devices used in the apparatus are identical. Only the right hand clamping device illustrated in FIG. 1 is described in further detail.

Figure 2:
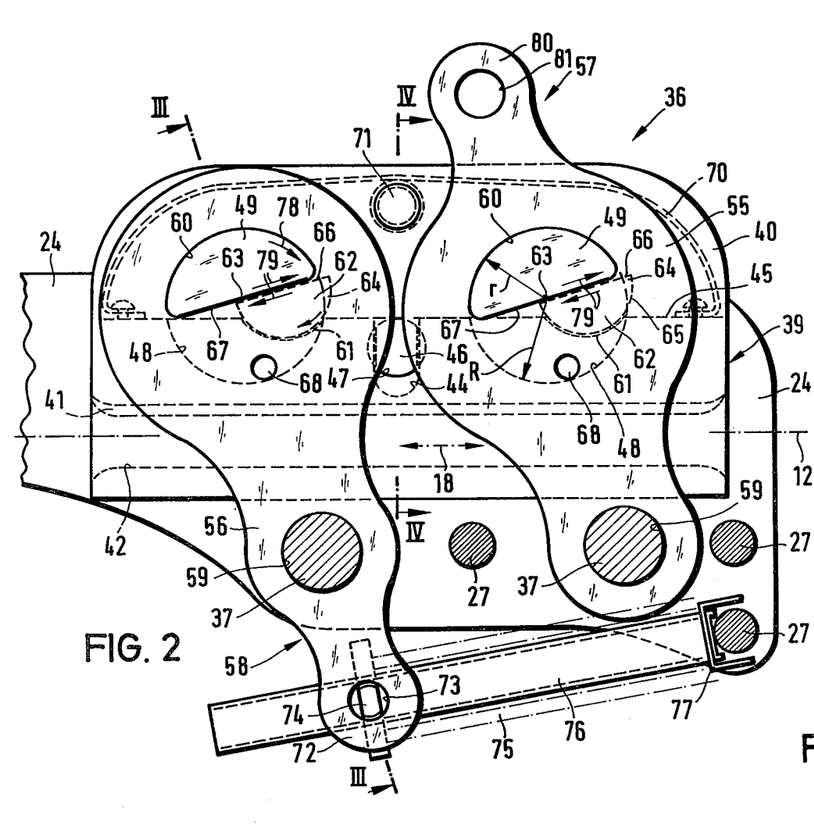
FIG. 2 is a longitudinal section on an enlarged scale of one of the clamping apparatus of the manual lifting apparatus according to FIG. 1 in the opened position, the near side traction rods having been removed for clarity.
Figure 3:
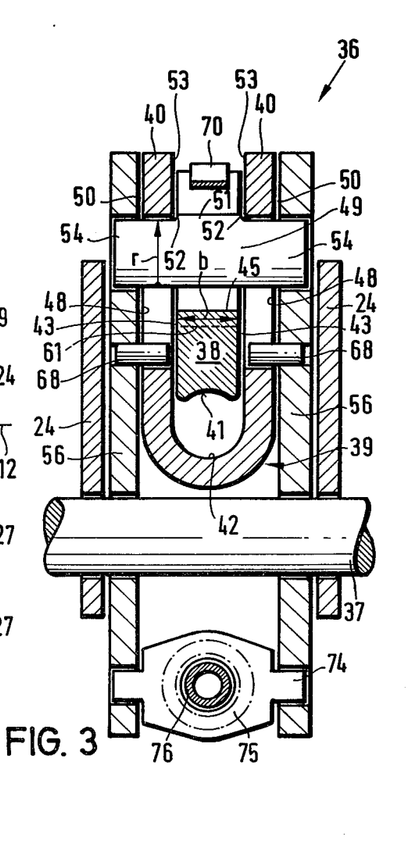
FIG. 3 is a cross section of the clamping apparatus of FIG. 2 along line III—III.

Referring now to FIGS. 2 and 3, it will be seen that the clamping device 36 is accommodated between the two traction rods 24 of the upper closing off assembly 28 and is linked thereto by means of two clamping lever shafts 37. Essentially, the clamping device 36 comprises a first clamping jaw 38 and a second clamping jaw 39. The second clamping jaw has a U-shaped cross section and embraces the first clamping jaw 38 which in general takes the form of a rectangular bar accommodated between the side flanges 40 of the second clamping jaw 39.

First clamping jaw 38 has a lower clamping surface 41 for engaging linear bodies such as rope 11 and an upper supporting area 45 in a plane substantially parallel to the clamping surface. The first clamping jaw 38 is slidable transversely to the longitudinal direction 18 of the traction means 11 in relation to the second clamping jaw 39. First clamping jaw 38 is held immovably in the longitudinal direction of the traction means 11 by coupling studs 46 fitted into holes 47 in side flanges 40 of second clamping jaw 39. Studs 46 engage grooves 44 machined into the side surfaces 43 of the first clamping jaw 38 transversely to the longitudinal direction 18 and open towards the upper supporting area 45. Whenever the sliding jaws 38 and 39 move towards one another transversely to the longitudinal direction 18 of the traction means, the coupling studs 46 slide along the grooves 44 and restrains the clamping jaws 38 and 39 from movement relative to one another in the longitudinal direction 18.

Two laterally aligned pairs of circular apertures 48 are provided in the side flanges 40 of second clamping jaw 39. The two laterally aligned pairs of apertures 48 are spaced from one another in the longitudinal direction 18. A clamping key 49 is inserted through each pair of mutually aligned apertures 48 and projects beyond the outer surfaces 50 of the side flanges 40. The clamping keys 49 have a chord truncated circular cross section. This cross section can be semi-circular or the greater or lesser portion of a circle divided by a nondiametric chord. The central regions 51 of clamping keys 49 has an enlarged cross section providing two shoulders 52 which abut against the inner surfaces 53 of the respective two side flanges 40. Each of the projecting ends 54 of the clamping key 49 has a clamping lever 55, 56 fitted thereon. The clamping levers 55 and 56 shown are the visible halves of pairs of identical clamping levers 57 and 58. Clamping lever pair 57 is not quite identical in shape to clamping lever pair 58. However, all clamping levers 55 and 56 have a bore 59 rotatably accepting clamping lever shafts 37 of the upper closing off assembly 28. Chord truncated circular apertures 60 are provided in each clamping lever 55, 56 a distance from bores 59 which engage the projecting ends 54 of the clamping keys 49 with a matching fit.

While clamping keys 49 are fixed in the clamping levers 55 and 56 by the matching non-circular fit, they are freely rotatable in the circular aperture 48 of clamping jaw 39. The radius of curvature r of the partly cylindrical clamping key 49 in the region of the second clamping jaw 39 matches or is slightly less than the radius R of the circular aperture 48.

As best seen in FIG. 2, two arcuate recesses 61 are provided in the upper surface 45 of the first clamping jaw 38 extending transversely to the longitudinal direction 18 of the clamping jaws 38 and 39. Each of these part cylindrical recesses 61 rotatably supports a pressure member 62 which has a chord truncated circular cross-section and is equal in axial length perpendicular to the cylinder generatrix to the width b of the first clamping jaw 38. The part cylindrical recesses 61 in the first clamping jaw 38 are staggered in relation to the centers 63 of the circular apertures 48 in the second clamping jaw 39 such that the pressure members 62 mounted therein are partly outside the outlines of the apertures 48, thus, having a portion 64 positioned between the inner surfaces 53 of the side flanges 40 of the second clamping jaws 39. As a result, the pressure members 62 are always retained laterally between these side flanges 40 of the second clamping jaw 39.

Plane surface 66 of the pressure member 62 opposite the cylinder surface 65, slidably engages flattened region 67 of the part cylindrical clamping key 49, the latter being fixed to the respective pair of clamping levers 55 or 56 respectively. The clamping levers 55 and 56 respectively are provided with guide studs 68 on their insides diametrically opposed to the clamping keys 49 which will slide along the edges of the apertures 48 when the clamping levers 55 or 56 are swung.

In order to provide a matching fit of the individual components of the clamping jaws in the opened position illustrated in FIGS. 2 and 3 and maintain all mating surfaces in contact; a spring 70 is fixed to the ends of the upper sliding area 45 of the first clamping jaw 38 by which the jaw is suspended from a spacer member 71 fixed between the upper edges of the side flanges 40 of the U-shaped second clamping jaw 39.

As will be apparent from FIGS. 2 and 3, the clamping levers of the left hand pair of clamping levers 58 have extensions 72 including bores 73 of their lower end. A spring support 74 retained in bores 73 supports one end of compression spring 75 which surrounds a guide rod 76. Saddle 77 bearing against rivet 27 supports the opposite end of spring 75. The compression spring 75 biases the clamping lever pair 58 about the center 63 of the circular apertures 48 in a clockwise direction as shown by arrow 78 by urging rotation of the clamping levers 58 about the clamping lever shafts 37. This spring biasing presses the flattened regions 67 of the clamping keys 49 against the plane surfaces 66 of the pressure members 62 which in turn exercise a clamping force on the upper clamping jaw 38 and thus onto the traction means 11 transversely to the longitudinal direction of traction means 11. The longitudinal movement of clamping key 49 causes pivoting of the pressure members 62 with their cylindrical peripheries 65 rotating in the partly cylindrical recesses 61 of the first clamping jaws 38 and the flattened regions 67 of the clamping keys 49 sliding along the plane surfaces 66 of the pressure members 62 as indicated by the arrows 79. The first clamping jaw 38 can therefore move in a direction normal to the axis of traction means 11 in response to the swinging movement of the clamping levers 58, 57.

The clamping levers 57 have extensions 80 projecting upwardly beyond the clamping jaws and provided with an eye 81 for connecting to a reversing lever 82 or a reversing rod 83 (FIG. 1).

Referring once again to FIG. 1, reversing lever 82 projects from the upper side of casing 13 and is linked by way of a reversing bolt 84 to the clamping lever 55 of that clamping device 36 which is closest to the crank shaft block 22. The reversing lever 82 is connected to the clamping lever 55 of the second clamping device 36 by reversing rod 83. The reversing rod 83 comprises two halves only one of which is illustrated. Reversing rods 83 embrace the clamping lever 55 at one end and embrace the reversing lever 82 at their opposite ends. The divided reversing rod 83 is linked by a reversing bolt 84 to the clamping levers 55 of the right hand clamping device 36 and by the reversing lever bolt 85 to the reversing lever 82.

Two identically shaped operating strips 86 (only one shown) are provided on both sides of reversing lever 82 and reversing rods 83. The operating strips 86 are linked to an operating lever 88 by means of an operating lever pin 87, the lever being mounted pivotally in the casing 13 by way of an operating lever pin 89. The opposite ends of the operating strips are provided with elongate holes 90 permitting their sliding along the reversing lever shaft 91. The reversing bolt 84 and the reversing lever bolt 85 are fitted on diametrically opposite sides of the reversing lever shaft 91 equidistant in respect of the reversing lever shaft 91.

The left hand clamping lever bolts 37 of the left hand clamping device 36 (FIG. 1) engage corresponding bores of the push and pull rods 23 of the closing off assembly 26 and are secured against disassembly by circlips 92 or the like. The left hand clamping lever bolts 37 of the right hand clamping device 36 are connected in similar manner to the push and pull rods 24 of the closing off assembly 28 and are similarly secured. The right hand clamping lever bolts 37 of each clamping device 36 carry rolls 93 on their outside which roll along rails (not illustrated) shaped into the casing 13, thereby guiding the clamping devices 36 longitudinally 18 in the casing.

The manual lifting apparatus 10 operates as follows.

Load 17 is suspended from rod 11 which is to be pulled through the apparatus 10 in the direction of the arrow 19. The lifting apparatus 10 is attached to a fixed point by eye 16. Advance lever 20 is moved back and forth in the direction of arrow 35. When advance lever 20 swings clockwise, the push and pull rods 23 of the lower closing off assembly 26 move to the left thus carrying along clamping lever bolts 37 and clamping levers 55, 56 of the left hand clamping device 36. The upper portions of clamping levers 55, 56 engaged to clamping keys 49 perform a swinging movement about the center points 63 of the circular apertures 48 of second clamping jaw 39 with guide studs 68 provided on the clamping levers 55, 56 sliding along the marginal edges of the circular apertures 48. In the course of this swinging movement the flattened region 67 of clamping keys 49 press against the plane surfaces 66 of the pressure members 62 which then pivot in their respective part cylindrical recesses 61 in the upper clamping jaw 38 pressing against the rope 11 causing it to be clamped between the clamping surfaces 41, 42 of the clamping jaws 38, 39 of this clamping device. The rope 11 is gripped and moved in the direction of the arrow 19 with left hand clamping device 36 which moves to the left with the lower closing off assembly 26. As explained earlier the gripping force exerted on rope 11 is completely transverse to its longitudinal direction 18.

As the advance lever 20 swings clockwise, the push and pull rods 24 of the upper closing off assembly 28 in FIG. 1 are simultaneously moved to the right. Push and pull rods 24 move clamping lever bolts 37 and thus the lower portions of clamping levers 55 and 56 of the right hand clamping device 36 swinging these clamping levers against the action of the compressive spring 75 counterclockwise about the center point 63 of the circular apertures 48 in the second clamping jaw 39. The clamping surfaces 41, 42 of the clamping jaws 38 and 39 release the rope 11 permitting it to slide between the clamping jaws. The right hand clamping device 36 is moved to the right in FIG. 1 along rope 11 until the extreme position has been attained or the clockwise stroke of advance lever 20 is ended.

Swinging of the advance lever 20 in the direction of arrow 35 towards the left (counter clockwise) causes movement of the push and pull rods 24 of the upper closing off assembly 28 toward the left and of the push and pull rods 23 of the upper closing off assembly 26 towards the right. This causes swinging of the clamping levers 55 and 56 of the right hand clamping device 36 clockwise to force together the clamping jaws 38 and 39 such that the rope 11 is held clamped by the right hand clamping device 36 and is moved along in the direction of the arrow 19 with the push and pull rods 24 now moving to the left. At the same time clamping levers 55 and 56 of the left hand clamping device 36 are swung counter-clockwise causing the clamping jaws 38 and 39 of this clamping device to be released from the rope 11, permitting left hand clamping device 36 to be moved along the rope 11 in a direction opposite that of arrow 19 with the push rods 23 of the lower closing off assembly 26.

Thus the clamping devices 36 will move alternatingly together and apart, the rope being alternatingly clamped and carried along by a clamping device while the other clamping device is released off the rope and moves opposite the direction of traction 19 along the rope with the to and fro swinging of advance lever 20.

When the load 17 suspended from the rope 11 is to be let down, the rope 11 must pass through the apparatus opposite the direction of arrow 19 under tension or constraint. The reverse lever 82, which moved loosely during the pulling in the traction direction of the rope, is now also swung back and forth as indicated by arrow 35'.

The reversing lever 82 swings about reversing lever shaft 91 which is prevented from moving by operating shaft 91 fixed to operating lever 88 which is in turn restrained by operating lever pin 89 fixed to the case. When reversing lever 82 is swung clockwise, left hand clamping device clamping lever 55 is swung counterclockwise by way of the reversing bolt 84. This causes the clamping jaws 38, 39 to be released from the rope 11 and the clamping device is free to slide along the rope 11 in the direction of the arrow 19. Simultaneously, the reversing lever 82 by way of the reversing lever bolt 85 pushes reversing rod 83 and the reversing bolt 84 on the clamping lever 55 of the right hand clamping device 36. This causes a clockwise swinging movement of the clamping levers 55, 56, whereby the rope 11 is clamped between the clamping jaws 38, 39 of the right hand clamping device and is moved to the right against the direction of the arrow 19 under tension. Because of the positive connection of the clamping levers 56 of both clamping devices 36 to the clamping levers 55 by the push rods 23 and 24 and the clamping key 49—first clamping jaw 38 assembly, the clamping levers 55, 56 will always move in synchronisation.

In a manner similar to that described above, counterclockwise swinging of the reversing lever 82 causes clockwise swinging of the clamping levers 55 and 56 of the left hand clamping device 36, so that the rope 11 becomes clamped between the clamping jaws 38 and 39 of this clamping device and is at the same time moved towards the right against the direction of the arrow 19 while the clamping levers 55 and 56 of the right hand clamping device 36 are swung counterclockwise causing the clamping jaws of that clamping device to release the rope, permitting the right hand clamping device 36 to slide along the rope in the direction of arrow 19.

To remove or insert rope 11 into the manual lifting apparatus 10, the operating lever 88 is actuated to release from the rope the clamping jaws 38 and 39 of both clamping devices 36 simultaneously. The operating lever 88 is swung counterclockwise forcing operating strips 86 and the reversing lever shaft 91 to the left. This moves the reversing bolt 84 and the reversing lever bolt 85 causing all clamping levers 55 and 56 of both clamping devices 36 to be swung counterclockwise and all clamping jaws move apart under the action of the spring 70 to release the rope 11.

If none of the levers 20, 82 and 88 are operated, the clamping levers 55, 56 are biased clockwise by the compression on springs 75 and the clamping keys 49 press by way of the pressure member 62 onto the clamping jaws 38. The wire rope 11 is clamped between the clamping jaws 38, 39 of both clamping devices 36. Since the rope 11 is under tension in the direction of arrow 19 generated by the load 17, the rope is inclined to pull the clamping devices 36 locked thereto against the direction of the arrow 19 towards the right. Since all push and pull rods 23, 24 are held immovably on the crank shaft block 22, the clamping levers are held by way of the clamping lever bolts 37 and the clamping levers 55, 56 are swung clockwise even further under the tension force of the rope. This causes the clamping pressure to increase automatically as the rope tension increases. In this manner the apparatus acts purely as a clamping and holding device.

Figure 5:
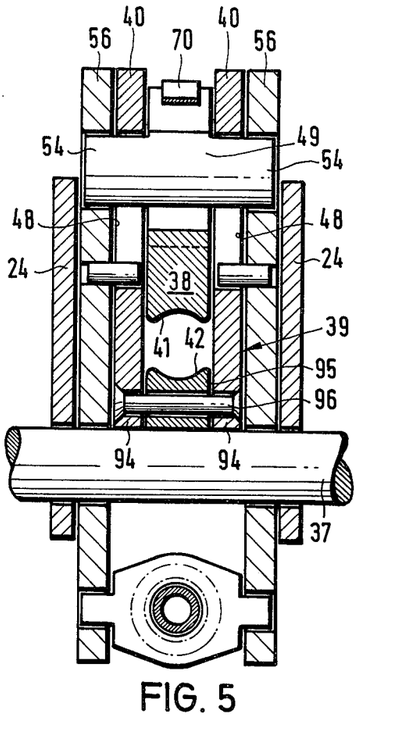
FIG. 5 is a cross section of a modified clamping apparatus taken along a line corresponding to line III—III in FIG. 2 in which the second clamping jaw has been assembled from lateral flanges and a clamping bar inserted therebetween.

A second embodiment of the clamping device according to the invention is illustrated in FIG. 5. This second embodiment corresponds essentially to the embodiment illustrated in FIGS. 2 and 3. Equivalent parts are denoted by the same reference numbers. The difference as compared with the previously described embodiment resides in that the second clamping jaw 39 is composed of a plurality of parts. The two side flanges 40 are not integral but are connected along their lower edges 94 to a clamping bar 95 by a plurality of rivets 96. The clamping bar 95 has a substantially rectangular cross section and a concave clamping surface 42 which opposes the clamping surface 41 on the underside of the first clamping jaw 38.

More than two clamping jaws may be provided when advantageous. For example, two upper clamping jaws and two lower clamping jaws extending longitudinally may be provided side by side. The four jaws can then grip the traction means laterally by using upper and lower centering bars driving the clamping jaws together laterally as well as toward one another in the vertical direction. Furthermore, it is possible to provide only one clamping lever pair by means of which shortened clamping jaws can be moved towards one another. In simple clamping apparatus for arresting the tension means or for the lifting of minor loads, the single clamping lever would suffice for the operation of the clamping apparatus. The single clamping lever is either on one side only of the tension member or is made of fork-shaped design.

Figure 4:
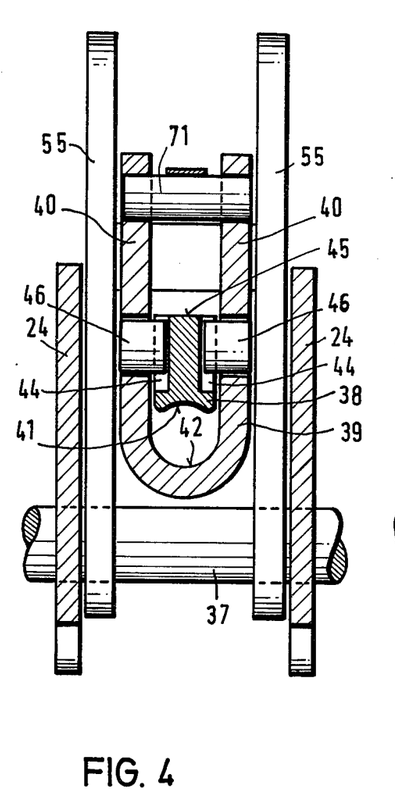
FIG. 4 is a cross section of the clamping apparatus of FIG. 2 along line IV—IV.
Figure 6:
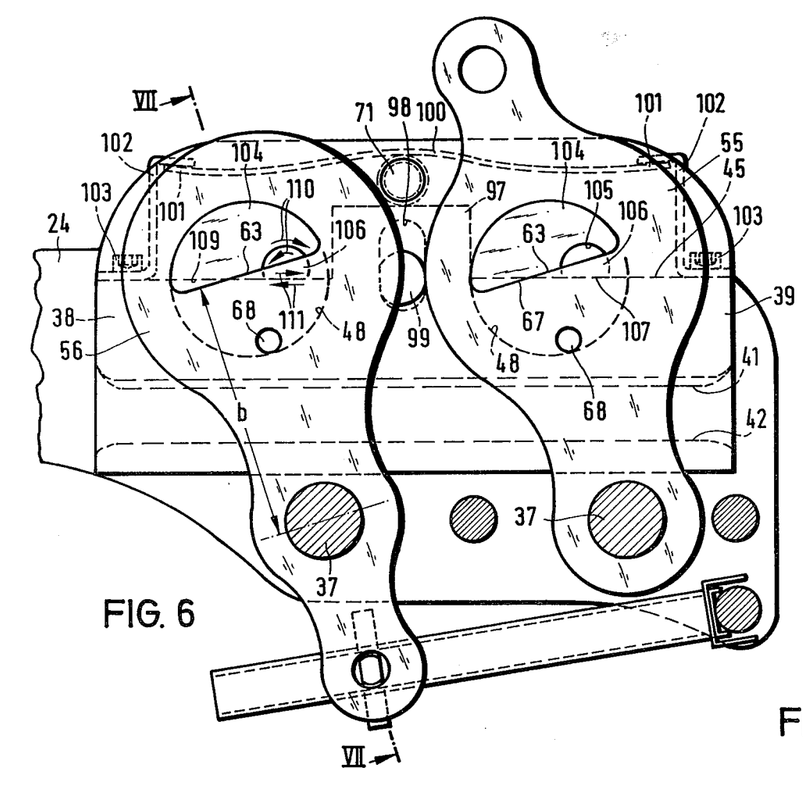
FIG. 6 is a longitudinal section of another embodiment of the clamping apparatus according to the invention in a view corresponding to that of FIG. 3.
Figure 7:
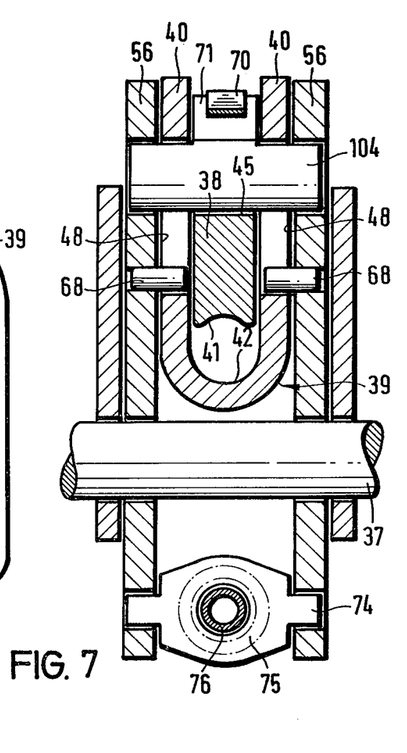
FIG. 7 is a cross section of the clamping apparatus of FIG. 6 in cross section along line VII—VII.
Figure 8:
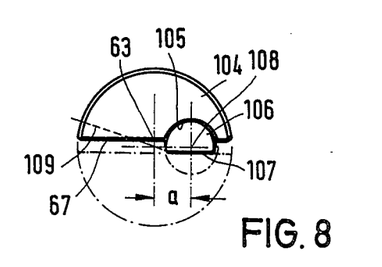
FIG. 8 is a detail plan of the clamping key and its associated pressure member of FIG. 6 in side elevation.

A third embodiment is shown in FIGS. 6, 7 and 8. The clamping device of the third embodiment corresponds substantially to the embodiment shown in FIGS. 2, 3 and 4 and corresponding parts have been denoted by the same reference numbers.

As seen in FIGS. 6 and 7, the first clamping jaw 38 is provided with an upwardly projected hump 97 having an elongate hole 98 transversely through first or upper clamping jaw 38. A coupling rod 99 is accommodated in this hole and in bores in the side flanges 40 of the second clamping jaw 39. As a result, the first clamping jaw 38 is movable in relation to the second clamping jaw 39 transversely to the longitudinal direction 18 of the traction or tension means 11. The clamping jaws 38 and 39 cannot, however, move relatively to one another in the longitudinal direction of the traction means.

In order to provide a close fit, a leaf spring 100 is provided, the ends 101 of which hook under Z-shaped brackets 102 fastened by means of screws 103 at the ends of upper supporting surface 45 of the first clamping jaw 38. The spring 100 will bias first clamping jaw 38 upwardly against spacer member 71.

The clamping keys 104 have a chord truncated circular cross section and are fitted into the circular openings 48 of the second clamping jaw 39. Each clamping key 104 has a part cylindrical recess 105 in its flattened region 67 facing the clamping jaw 38. Recess 105 is laterally positioned off the central axis 63 of aperture 48. A pressure member 106 having a chord truncated circular cross section is mounted rotatably in recess 105 and supported with its plane surface 107 on the upper supporting surface 45 of first clamping jaw 38. Pressure member 106 is slidable on an upper supporting surface 45 which is parallel to the clamping surface 41, 42 on the clamping jaws 38, 39. The distance (FIG. 8) from the center 108 of the part cylindrical recess 105 to the central axis 63 of the aperture 48 which coincides with the axis of rotation of the part-cylindrical clamping key 104 in relation to the distance (FIG. 6) from the central axis 63 to the axis of the clamping lever bolt 37 determines the clamping ratio.

Clamping keys 104 are also provided with segment shaped recesses 109 in the central portion of flat region 67 open toward the flat region 67 and extending approximately radially. These recesses 109 accommodate the upper clamping jaw 38. This permits counterclockwise rotation of the clamping key 104 somewhat further and allows the clamping surfaces 41, 42 of the clamping jaws 38 and 39 to move apart somewhat further.

On clockwise swinging of the clamping levers 55 and 56 clamping keys 104 press by way of the part-cylindrical pressure members 106 onto the upper supporting surface 45 of the first clamping jaw 38 thus pressing it against the second clamping jaw 39. This swinging of clamping levers 55 and 56 also causes pivoting of the pressure members 106 in the part-cylindrical recess 105 of the clamping keys 104 and simultaneous sliding in the longitudinal direction 18 of the tension means on the upper supporting surface 45 of the first clamping jaw 38 as indicated in FIG. 6 by the small arrows 110 and 111.

Figure 9:
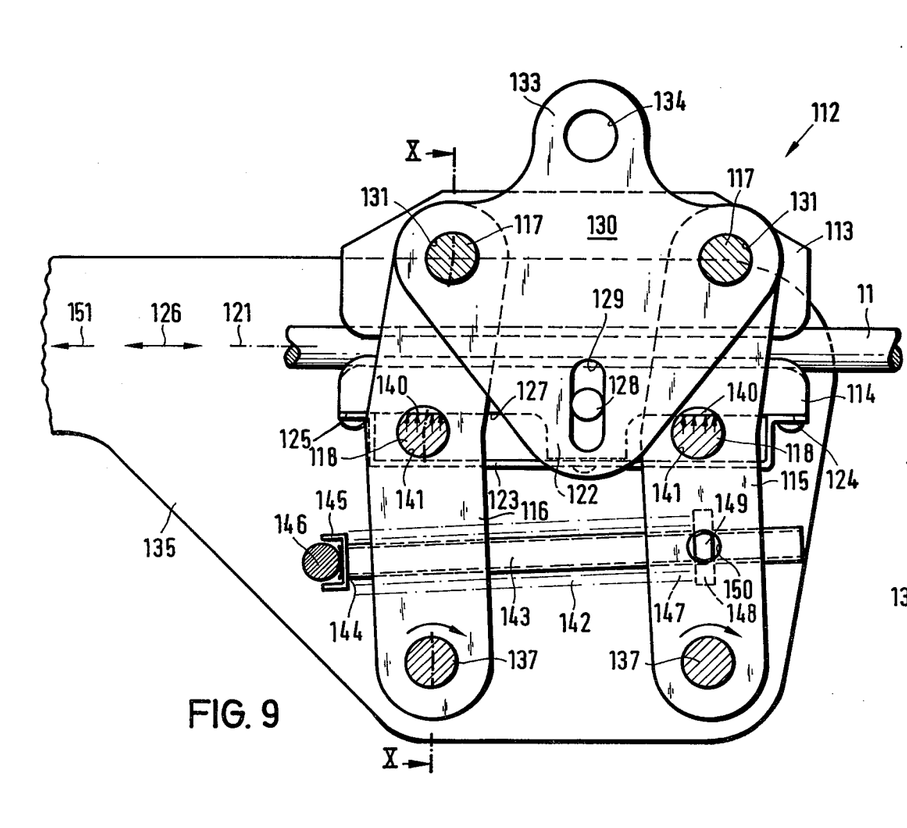
FIG. 9 is a longitudinal section of a further embodiment of the clamping apparatus according to the invention in a view corresponding to FIG. 2; and, FIG. 10 is a cross section of the clamping apparatus of FIG. 9 along line X—X of FIG. 9.
Figure 10:
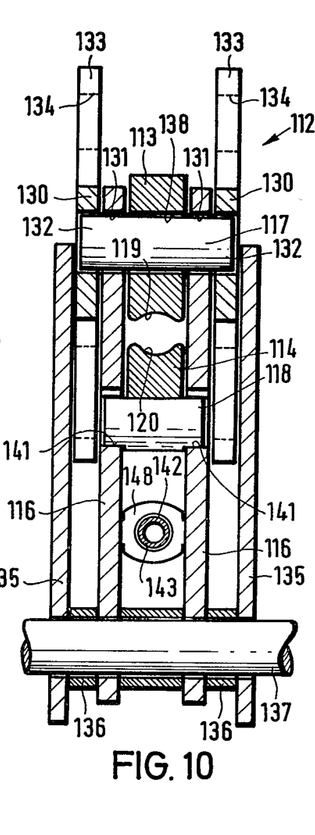

A fourth embodiment of the invention is shown in FIGS. 9 and 10 which can be used in conjunction with a manual lifting apparatus and which is slightly modified in respect of what is illustrated in FIG. 1.

As appears from FIGS. 9 and 10, the clamping device 112 essentially comprises a first clamping jaw 113 and a second clamping jaw 114 interconnected by two clamping lever pairs 115 and 116 and bolts 117 and 118 to form a linkage parallelogram. Both clamping jaws 113 and 114 have a substantial rectangular cross section and a clamping surface 119 and 120 respectively directed towards the rope and of slightly concave configuration adapted to clamp therebetween the tension or traction means 11, for example a wire rope or a steel rod, the longitudinal axis of which is denoted as 121.

The second clamping jaw 114 has a central downward-directed extension 122 on which a U-shaped stirrup 123 is fitted which extends in the longitudinal direction 126 under the lower supporting area 127 of the second clamping jaw 114 and is fixed at both its ends 124, 125 onto the support surface 127.

Coupling studs 128 are provided on both sides of the second lower clamping jaw 114 which engage into elongate holes 129 extending in a direction normal to the longitudinal direction 126 of the traction means and which are provided in two laterally positioned lugs 130. The lugs 130 have a generally triangular configuration and are fitted by means of two bores 131 onto the laterally projecting ends 132 of the bolts 117 which connect the first clamping jaw 113 to the clamping levers 115, 116. In their upper region 133 the lugs 130 have mutually aligned eyes 134 for linking to a reversing lever 82 or a reversing rod 83 by way of a reversing bolt 84 as has already been described further above in some detail.

The two clamping jaws 113, 114 can move in relation to one another only transversely, not in the direction 126 of the traction means since the coupling studs 128 which slide in the elongate holes 129 permit only transverse displacement, not a longitudinal displacement.

As best seen in FIG. 9, both pairs of clamping levers 115 and 116 are linked at their lower ends by means of clamping lever bolts 137 to push and pull rods 135 provided on both sides and held by spacer sleeves 136 at a distance from the clamping levers 116. The lever movement for clamping and pulling the rope 11 is provided to the clamping device 112 in a manner identical to that described in reference to the previous embodiments.

The bolts 117 which connect the clamping levers 115 and 116 to the first clamping jaw 113 are rotatably mounted in circular bores 138 of the first clamping jaw 113. The bolts 118 are designed as clamping keys or clamping bolts and are supported against the lower supporting area 127 of the second clamping jaw 114 on which they can move in the longitudinal direction 126. For this purpose the lower supporting area 127 is designed as a sliding support surface and the clamping bolts 118 have a flat portion 140 serving as a sliding surface by which they can slide along the sliding support area 127 of the second clamping jaw 114, while they pivot in the bearing holes 141 of the clamping levers 115 and 116 whenever these perform a swivel movement about their clamping lever bolts 137.

A compression spring 142 is provided to ensure that the clamping surface 119 and 120 of the clamping jaws 113 and 114 always lie in contact with the traction means 11. Compression spring 142 surrounds a spring guiding tube 143. Compression spring 142 is supported at one end by saddle 145 against a rivet 146 which interconnects the two push and pull rods 135. The opposite end 147 of the compression spring 142 abuts against a spring support plate 148 having lateral extensions 149 engaging mutually opposite bores 150 in the clamping levers 115. Accordingly, the compression spring 142 biases the clamping lever pair 115 and the clamping levers 116 connected thereto by way of the lugs 130 to swivel clockwise in relation to the push and pull rods 135.

This clockwise swivel movement causes the two clamping jaws 113 and 114 and the clamping levers 115 and 116 to move toward the right about bolts 117. The linkage parallelogram formed by bolts 117 and 118 is compressed, the bolts 117 pivoting in the bores 131 and 138 and the clamping bolts 118 sliding in the longitudinal direction 126 over the sliding support areas 127 of the second clamping jaw 114 and rotating in the bores 141 of the clamping levers 115. The clamping bolts 118 press transversely to the longitudinal direction 126 onto the lower sliding support area 127. Thus the clamping jaws 113 and 114 are pressed against one another and clamp the traction means or wire rope 11 firmly between the clamping surfaces 119 and 120 without movement relative to the longitudinal direction 126.

When a load is suspended from the rope clamped firmly between the clamping jaws 113 and 114 on the right hand side of the clamping device 112 in FIG. 9 and the push and pull rod 135 is moved to the left, the traction means is moved along in the direction of the arrow 151. Since the tension force exercised by the push and pull rods 135 onto the wire rope or the like is applied eccentrically by way of the clamping lever bolts 137, the rope clamped between the clamping jaws 113 and 114 is inclined to cause additional swivelling of the clamping lever pairs 115 and 116 about their clamping lever bolts 137. This causes further compression of the linkage parallelogram and the clamping pressure exercised by the clamping surface 119 and 120 onto the rope is increased further.

When force is applied to the eyes 134 of the lugs 130 and directed in the direction of arrow 151, the linkage parallelogram expands against the bias of the compression spring 142 such that the clamping jaws 113, 114 are moved apart. The clamping bolts 118 will then find support at their undersides against the U-shaped stirrup 123 causing the second clamping jaw 114 to be pulled downwardly.

Pivoting bolts 117 which connect the clamping levers 115, 116 to the first clamping jaw 113 can take the form of sliding clamping bolts. In such a modification they are advantageously provided with a flattened region as in the case of the clamping bolts 118 and slide along a support area provided on the first clamping jaw whenever the clamping levers 115, 116 are swivelled about their clamping lever bolts 137. The longitudinal holes 129 in the lugs 130 will then be lengthened such that they may accommodate coupling studs provided on the side surfaces of the first clamping jaw 113. In this manner, mutual displacement of the clamping bars 113, 114 in the longitudinal direction is prevented while all four linkage bolts slide along the clamping jaws 113 and 114 respectively during the clamping procedure.

It is apparent that neither the clamping levers 115, 116 nor the lugs 113 need be present in pairs. It is sufficient to provide one such lever and one such lug on one side of the clamping device provided these parts are designed sufficiently strongly and the coherence of the components is attained in a different manner.

The invention is not limited to the illustrated and described embodiments. Several modifications and amplifications are possible without leaving the scope of the invention. For example, the pressure members may be shaped onto the clamping keys and be so designed that they transfer pressure forces to the clamping jaws, but no sliding forces. The clamping keys may be of uniform cross section along their entire length or be of circular cross section in part if this results in advantages in a particular case. Moreover, it is not essential for the clamping bolts 118 to be flattened since they can slide along the sliding support areas 127 by way of their cylindrical peripheries so long as good lubrication is provided. It is also possible for the clamping jaws of the embodiments illustrated in FIGS. 2 to 7 to be interconnected by laterally arranged lugs in order to ensure their mutual non-displaceability in the longitudinal direction. It is furthermore possible for the pressure members by means of which the clamping keys find support on the supporting area of the first clamping jaws to be of different configuration, for example to have a cylindrical cross section.

The clamping device according to the invention is not only suitable for use with a tension, traction and lifting apparatus having a rope passing therethrough, but can also be employed advantageously with climbing apparatus by means of which a sliding shuttering or slip form can be lifted along climbing rods fixed into previously produced structural concrete or otherwise supported thereon.

The invention has been described with reference to preferred embodiments. Obviously, modifications, such as those described above and others, will occur to those skilled in the art upon reading and understanding this specification. It is my intention to include all such modifications and alterations insofar as they come within the scope of the appended claims or the equivalents thereof.

Having thus described the invention, the following is claimed:

1. In an apparatus for clamping and longitudinally moving an elongated traction means comprising at least one pair of clamping jaws comprising a first clamping jaw and a second clamping jaw on mutually opposite sides of said traction means and adapted to be moved in relation to one another transversely to said traction means; at least one clamping lever and at least one clamping key adapted to move said pair of clamping jaws into clamping engagement with said elongate traction means; the improvement comprising the side faces of said first clamping jaw being provided with grooves extending transversely to the longitudinal direction of said traction means and said second clamping jaw being provided with coupling studs fitted into bores on said flanges of the second clamping jaw thereby holding said pair of clamping jaws immovable in relation to one another in the longitudinal direction of said traction means.

2. In an apparatus for clamping and longitudinally moving an elongated traction means comprising at least one pair of clamping jaws comprising a first clamping jaw and a second clamping jaw on mutually opposite sides of said traction means and adapted to be moved in relation to one another transversely to said traction means; at least one clamping level and at least one clamping key adapted to move said pair of clamping jaws into clamping engagement with said elongate traction means; the improvement comprising said pair of clamping jaws being interconnected by at least one lug having an elongate hole extending transversely to the longitudinal direction of said traction means engaging a coupling stud provided on at least one of said pair of clamping jaws thereby holding said pair of clamping jaws immovable in relation to one another in the longitudinal direction of said traction means.

3. The improvement of claim 2, wherein said clamping key is a chord truncated cylindrical clamping rod having a flattened area along at least part of its length slidably engaging one of said pair of clamping jaws on a supporting area of said engaged clamping jaw extending approximately parallel to the clamping surface of said engaged clamping jaw.

4. In an apparatus for clamping and longitudinally moving an elongated traction means comprising at least one pair of clamping jaws comprising a first clamping jaw and a second clamping jaw on mutually opposite sides of said traction means and adapted to be moved in relation to one another transversely to said traction means; at least one clamping lever and at least one clamping key adapted to move said pair of clamping jaws into clamping engagement with said elongate traction means; the improvement comprising means holding said pair of clamping jaws immovable in relation to one another in the longitudinal direction of said traction means and said clamping key bears movably on a pressure member movable with respect to said clamping key which bears movably on said first clamping jaw.

5. The improvement of claim 4 wherein said pressure member is a chord truncated cylindrical member having a flattened plane surface extending parallel to the axis of the cylinder.

6. The improvement of claim 5, wherein said pressure member is rotatably mounted in a curved recess of fixed radius in said clamping key and said pressure member plane surface slidably engages a supporting surface on said first clamping jaw which extends approximately parallel to the clamping surface of said first clamping jaw.

7. In an apparatus for clamping and longitudinally moving an elongated traction means comprising at least one pair of clamping jaws comprising a first clamping jaw and a second clamping jaw on mutually opposite sides of said traction means and adapted to be moved in relation to one another transversely to said traction means; at least one clamping lever and at least one clamping key adapted to move said pair of clamping jaws into clamping engagement with said elongate traction means; the improvement comprising said clamping key bearing movably on a cylindrical pressure member having a flattened plane surface extending parallel to the axis of the cylinder rotatably mounted in a curved recess of fixed radius in said first clamping jaw and said clamping key slidably engages said plane surface of said pressure member and means being provided holding said pair of clamping jaws immovable in relation to one another in the longitudinal direction of said traction means.

8. In an apparatus for clamping and longitudinally moving an elongated traction means comprising at least one pair of clamping jaws comprising a first clamping jaw and a second clamping jaw on mutually opposite sides of said traction means and adapted to be moved in relation to one another transversely to said traction means; at least one clamping lever and at least one clamping key adapted to move said pair of clamping jaws into clamping engagement with said elongate traction means; the improvement comprising said first clamping jaw being accommodated between two side flanges of said second clamping jaw and said side flanges of said second clamping jaw being provided with circular apertures in which said clamping key is rotatably mounted, said clamping key bearing movably on a pressure member which bears movably on said first clamping jaw and means being provided holding said pair of clamping jaws immovable in relation to one another in the longitudinal direction of said traction means.

9. The improvement of claim 8 wherein said clamping key has a chord truncated cylindrical shape with its generatrix being a chord truncated circle over a least a part of its length, with a radius of curvature approximately equal to the radius of said circular apertures in said second clamping jaw.

10. The improvement of claim 8, wherein said pressure member is retained in a recess in said first clamping jaw offset in the longitudinal direction of said traction means in relation to the center of said circular apertures in said second clamping jaw such that a portion of said pressure member is retained transversely between said side flanges of said second clamping jaw.

11. The improvement of claim 8, wherein a clamping lever is fixedly connected to said clamping key, said clamping lever having a guide stud which engages said circular aperture in said side flange of said second clamping jaw.

12. In an apparatus for clamping a linear body, comprising at least one first clamping jaw and at least one second clamping jaw provided on mutually opposite sides of said linear body, means connecting said first and second clamping jaws to at least two clamping levers to form a linkage parallelogram, said first and second clamping jaws being adapted to be moved in relation to one another transversely to the longitudinal direction of said linear body, the improvement comprising means fixing said first and second clamping jaws in relation to one another in the longitudinal direction of said linear body and said connecting means being slidable on a flat support surface provided on said second clamping jaws and extending approximately parallel to the clamping surface of said second clamping jaws.

13. The improvement of claim 12, wherein a spring is attached to one of said first and second clamping jaws which jaws maintain said connecting means associated with one of said first or second clamping jaws in sliding engagement with said support surface.

14. In an apparatus for clamping a linear body, comprising at least one first clamping jaw and at least one second clamping jaw provided on mutually opposite sides of said linear body, means connecting said first and second clamping jaws to at least two clamping levers to form a linkage parallelogram, said first and second clamping jaws being adapted to be moved in relation to one another transversely to the longitudinal direction of said linear body, the improvement comprising said first and second clamping jaws being fixed in relation to one another in the longitudinal direction of said linear body by at least one lug fitted to one of said first and second clamping jaws and on which the other of said first and second clamping jaws is mounted movably in a direction transversely to the clamping surface by means of a slot and pin connection extending in a direction normal to the longitudinal direction of said linear body and said connecting means associated with said second clamping jaws being slidable on a support surface providing on said second clamping jaws and extending approximately parallel to the clamping surface of said second clamping jaws.

15. The improvement of claim 16 wherein said lug is fitted onto cylindrical means interconnecting said first clamping jaw to said clamping levers and said lug has an elongated aperture receiving coupling studs provided on said second clamping jaw.

16. In an apparatus for clamping a linear body, comprising at least one first clamping jaw and at least one second clamping jaw provided on mutually opposite sides of said linear body, means connecting said first and second clamping jaws to at least two clamping levers to form a linkage parallelogram, said first and second clamping jaws being adapted to be moved in relation to one another transversely to the longitudinal direction of said linear body, the improvement comprising said first and second clamping jaws being fixed in relation to one another in the longitudinal direction of said linear body, said connecting means associated with said second clamping jaws being slidable on a support surface provided on said second clamping jaws and extending approximately parallel to the clamping surface of said second clamping jaws said second clamping jaws being U-shaped in cross-section and said first clamping jaws fitted between the side flanges of said U-shaped second clamping jaw being suspended by way of a spring attached to said first clamping jaws passing thereover in the longitudinal direction, said spring being fixed to a spacer member fixed to said side flanges of said U-shaped second clamping jaws said spring maintaining said connecting means associated with one of said first or second clamping jaws in sliding engagement with said support surface.

* * * * *